UNITED STATES PATENT OFFICE.

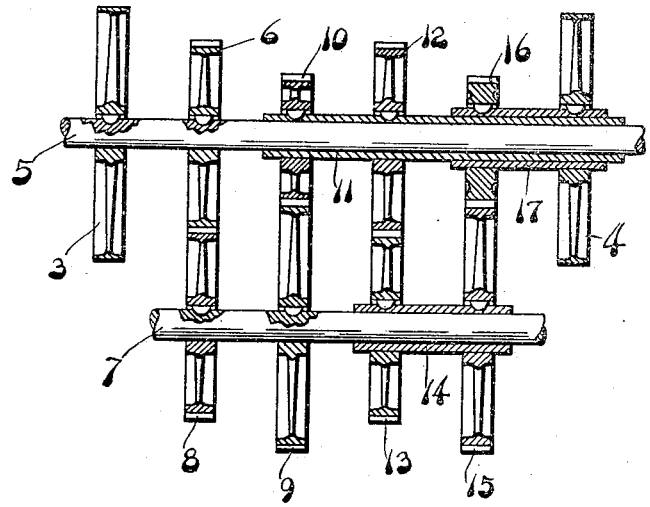

THADDEUS A. NOLAN, OF CINCINNATI, OHIO.

MECHANICAL MOVEMENT.

1,212,385.  Specification of Letters Patent.  Patented Jan. 16, 1917.

Application filed January 8, 1916. Serial No. 70,920.

*To all whom it may concern:*

Be it known that I, THADDEUS A. NOLAN, a citizen of the United States, residing at Cincinnati, in the county of Hamilton and State of Ohio, have invented certain new and useful Improvements in Mechanical Movements, of which the following is a specification.

This invention relates to an improved mechanical movement and has for an object to produce a mechanical movement adapted to transmit power from a slowly moving member to a member to be driven at a high rate of speed, through a series of speed increases, utilizing the motion of the preceding speed increase to assist in the substantial elimination of excessive friction occasioned by the high speed of each succeeding speed increase.

A further object is to produce a mechanical movement especially adapted to transmit power from a driving member operating at a high rate of speed to a driven member operating at a reduced rate of speed, or to transmit power from a driving member operating at a reduced rate of speed to a driven member operating at a high rate of speed.

These and other objects are attained in the mechanical movement described in the following specification and illustrated in the accompanying drawings in which—

Figure 1 is a fragmental sectional view of a mechanical movement embodying my invention shown in a somewhat diagrammatic manner. Fig. 2 is an elevational view of an electric motor coupled with and driving an air compressor by means of a mechanical movement embodying my invention, the movement being shown in section.

In the drawings I have illustrated the preferred form of my invention and in describing the construction thereof I will first describe the more or less diagrammatic embodiment illustrated in Fig. 1.

The pulley 3 for purposes of description will be considered the driving pulley of the movement and the pulley 4 the driven pulley. The pulley 3 is keyed to a shaft 5 which is provided with a gear 6 also keyed thereto adjacent to the pulley. Located adjacent to the shaft 5 is a shaft 7 which extends parallel thereto and to which are keyed gears 8 and 9. Gear 8 is preferably of the same diameter as gear 6 and meshes therewith so that shaft 7 will be driven at the same rate of speed as shaft 5, but in an opposite direction. Gear 9 is larger in diameter than either of the gears 6 and 8 and meshes with a gear 10 keyed to a sleeve 11 rotatively mounted on shaft 5. Because of the increased diameter of gear 9 and the necessarily decreased diameter of gear 10 the latter has a greater speed of rotation than gear 6 and its mounting shaft 5. Because of this the sleeve 11, to which gear 10 is secured, is rotated at a higher rate of speed than shaft 5, but in the same direction.

Adjacent to the gear 10 is a gear 12 keyed to the sleeve 11 and preferably of the same diameter as the gear 6. This gear 12 meshes with the gear 13 of the same diameter as gear 8 but which is keyed to a sleeve 14 rotatively mounted on shaft 7. Because of the high speed of rotation of sleeve 11, and consequently gear 12 over gear 6, gear 13 and its mounting sleeve 14 will rotate at a correspondingly greater speed of rotation over gear 8 and its mounting shaft 7, but in the same direction. In this construction the speed of rotation of the driving pulley 3, shaft 5, gears 6 and 8, shaft 7, and gear 9 are the same, since gears 6 and 8 are of the same diameter. The speed of rotation of gear 10 is greater than that of gear 9 because of the smaller diameter of gear 10. For this reason sleeve 11, to which gear 10 is keyed, will rotate faster than shaft 5 but in the same direction, and gear 12 also keyed to the sleeve 11, will rotate at the same speed therewith.

Because of the increased speed of gear 12 over gear 6, which is of the same diameter, gear 13 which is of the same diameter as gear 8 and which is keyed to sleeve 14, will rotate faster than gear 8 and consequently rotate sleeve 14 faster than shaft 7, but in the same direction. Gear 15 being keyed to sleeve 14 will rotate gear 16 faster than gear 10 and therefore rotate sleeve 17 faster than sleeve 11 but in the same direction, thus giving driven pulley 4 a much higher speed of rotation than driving pulley 3.

In the application of my invention in Fig. 2, I have shown an electric motor 18 coupled with an air compressor 19 and adapted to drive the compressor by means of a mechanical movement embodying my invention. In this illustration the movement is shown in section to disclose how the construction thereof may be modified. The gears 15ᵃ and 13ᵃ are formed integrally with the sleeve 14ᵃ instead of separately as are the gears 13 and 15 and sleeve 14 in Fig. 1. This is also true of gears 12ᵃ and 10ᵃ and sleeve 11ᵃ as compared with gears 10 and 12 and sleeve 11 in Fig. 1.

Although in my description of Fig. 1 I have described my invention as having the rotational speed increased from the point of application to the point of distribution of power, I have reversed the order in Fig. 2 and decreased the rotational speed from the point of application to the point of distribution of power, a high speed motor being employed while the compressor is one designed to run at slow speed.

The principal advantage attained by my invention is that I am enabled to obtain a very high rotational speed of the driven member from a comparatively slow speed of the driving member without having to construct a bearing especially designed for high speed. This is accomplished because of the fact that only the shafts 5 and 7 are journaled in the bearings, the sleeves 11 and 14 rotating somewhat faster on these shafts which are also rotating in the same direction, with the sleeve 17 rotating somewhat faster on the sleeve 11. Thus the bearing speeds are maintained within the speed limit for which the bearings were designed, and the speed of sleeve 11 relatively to shaft 5, the speed of sleeve 14 relatively to shaft 7, and the speed of sleeve 17 relatively to sleeve 11, are kept within the limits of safety to avoid burning out the relatively movable contacting surfaces of the bearings, shafts and sleeves.

Another advantage attained by my improved movement is that I may employ it as a coupling mechanism between a machine requiring relatively great power to drive it and which operates at a slow speed, and a driving means which operates at a high rate of speed but which possesses little power. In addition to this, although I have illustrated and described my movement as having intermeshing gears for driving the several rotating shafts and sleeves, I may employ any suitable means for communicating power from one shaft to another and from one sleeve to another. Furthermore, although I have shown the sleeves as having plain bearings upon the shafts and upon one another, I may mount the shafts and sleeves in any suitable manner which will aid in materially eliminating friction.

It will be understood that my invention is not limited to the single embodiment illustrated and described, it being as readily adaptable to other mechanisms to which it could be applied.

Having thus described my invention what I claim is—

1. In combination in a mechanical movement, a driving shaft, a secondary shaft, a sleeve rotatively mounted on the driving shaft, a sleeve rotatively mounted on the secondary shaft, a driven sleeve rotatively mounted on the first mentioned sleeve, motion communicating means secured to the shafts, a second motion communicating means secured to the secondary shaft and the first mentioned sleeve a third motion communicating means secured to the first and second mentioned sleeves, and a fourth motion communicating means secured to the second mentioned and driven sleeves, certain of said means varying in speed ratio to drive said first mentioned sleeve faster than said driving shaft, said second mentioned sleeve faster than the secondary shaft, and said driven sleeve faster than the said first mentioned sleeve.

2. In combination in a mechanical movement, a driving shaft, a secondary shaft, a sleeve rotatively mounted on the driving shaft, a sleeve rotatively mounted on the secondary shaft, a driven sleeve rotatively mounted on the first mentioned sleeve, a set of intermeshing gears secured to the shafts, a set of intermeshing gears secured to the secondary shaft and first mentioned sleeve, a set of intermeshing gears secured to the first and second mentioned sleeves, and a set of intermeshing gears secured to the second mentioned and driven sleeves, certain of said sets of gears varying in speed ratio to drive said first mentioned sleeve faster than said driving shaft, said second mentioned sleeve faster than the secondary shaft, and said driven sleeve faster than said first mentioned sleeve.

3. In combination in a mechanical movement, a driving shaft, a secondary shaft, a sleeve rotatively mounted on the driving shaft, a sleeve rotatively mounted on the secondary shaft, a driven sleeve rotatively mounted on the first mentioned sleeve, motion communicating means secured to the shafts, a second motion communicating means secured to the secondary shaft and the first mentioned sleeve, a third motion communicating means secured to the first and second mentioned sleeves, and a fourth motion communicating means secured to the second mentioned and driven sleeves, said means being adapted to drive the shafts at substantially the same speed, the first mentioned sleeve faster than the driving shaft, the second mentioned sleeve faster than the secondary shaft, and the driven sleeve faster than the first mentioned sleeve.

4. In combination in a mechanical movement, a driving shaft, a secondary shaft, a sleeve rotatively mounted on the driving shaft, a sleeve rotatively mounted on the secondary shaft, a driven sleeve rotatively mounted on the first mentioned sleeve, a set of intermeshing gears secured to the shafts, a set of intermeshing gears secured to the secondary shaft and first mentioned sleeve, a set of intermeshing gears secured to the first and second mentioned sleeves, and a set of intermeshing gears secured to the second mentioned and driven sleeves, said sets of gears being adapted to drive the shafts at substantially the same speed, the first mentioned sleeve faster than the driving shaft, the second mentioned sleeve faster than the secondary shaft, and the driven sleeve faster than the first mentioned sleeve.

5. In combination in a mechanical movement, a shaft, a second shaft, a sleeve rotatively mounted on the first mentioned shaft, a sleeve rotatively mounted on the second mentioned shaft, a sleeve rotatively mounted on the second sleeve, and intermeshing sets of gears secured to the sleeves, certain of said sets of gears varying in speed ratio to drive said third mentioned sleeve faster than said first and second mentioned sleeves.

6. In combination in a mechanical movement, a shaft, a second shaft, a sleeve rotatively mounted on the first mentioned shaft, a sleeve rotatively mounted on the second mentioned shaft, a sleeve rotatively mounted on the first mentioned sleeve, and motion communicating means secured to the sleeves, certain of said means varying in speed ratio to drive said third mentioned sleeve faster than said first and second mentioned sleeves.

7. In combination in a mechanical movement, a shaft, a second shaft, a sleeve rotatively mounted on the first mentioned shaft, a sleeve rotatively mounted on the second mentioned shaft, a sleeve rotatively mounted on the second mentioned sleeve, a motion communicating means secured to the first and second mentioned sleeves, and a second motion communicating means secured to the second and last mentioned sleeves, said first mentioned means being adapted to drive the first and second mentioned sleeves at substantially the same speed, said second mentioned means being adapted to drive the last mentioned sleeve faster than said first and second mentioned sleeves.

8. In combination in a mechanical movement, a shaft, a second shaft, a sleeve rotatively mounted on the first mentioned shaft, a sleeve rotatively mounted on the second mentioned shaft, a sleeve rotatively mounted on the second mentioned sleeve, a set of intermeshing gears secured to the first and second mentioned sleeves, and a set of intermeshing gears secured to the second and last mentioned sleeves, said first mentioned set being adapted to drive the first and second mentioned sleeves at substantially the same speed, said second mentioned set being adapted to drive the last mentioned sleeve faster than said first and second mentioned sleeves.

In testimony whereof I affix my signature in the presence of two witnesses.

THADDEUS A. NOLAN.

Witnesses:
W. THORNTON BOGERT,
THOS. G. WRIGHT.

Copies of this patent may be obtained for five cents each, by addressing the "Commissioner of Patents, Washington, D. C."